No. 664,018. Patented Dec. 18, 1900.
J. W. EISENHUTH.
MOTOR FOR VEHICLES.
(Application filed Jan. 25, 1900.)

(No Model.) 4 Sheets—Sheet 1.

WITNESSES: INVENTOR
John W. Eisenhuth
BY
ATTORNEYS

No. 664,018. Patented Dec. 18, 1900.
J. W. EISENHUTH.
MOTOR FOR VEHICLES.
(Application filed Jan. 25, 1900.)

(No Model.) 4 Sheets—Sheet 2.

WITNESSES:

INVENTOR
John W Eisenhuth.
BY
ATTORNEYS

No. 664,018. Patented Dec. 18, 1900.
J. W. EISENHUTH.
MOTOR FOR VEHICLES.
(Application filed Jan. 25, 1900.)

(No Model.) 4 Sheets—Sheet 3.

WITNESSES:
Fenton S. Belt,
Marcus L. Byng.

INVENTOR
John W. Eisenhuth.
BY
Mason Fenwick Lawrence
ATTORNEYS

No. 664,018. Patented Dec. 18, 1900.
J. W. EISENHUTH.
MOTOR FOR VEHICLES.
(Application filed Jan. 25, 1900.)
(No Model.) 4 Sheets—Sheet 4.
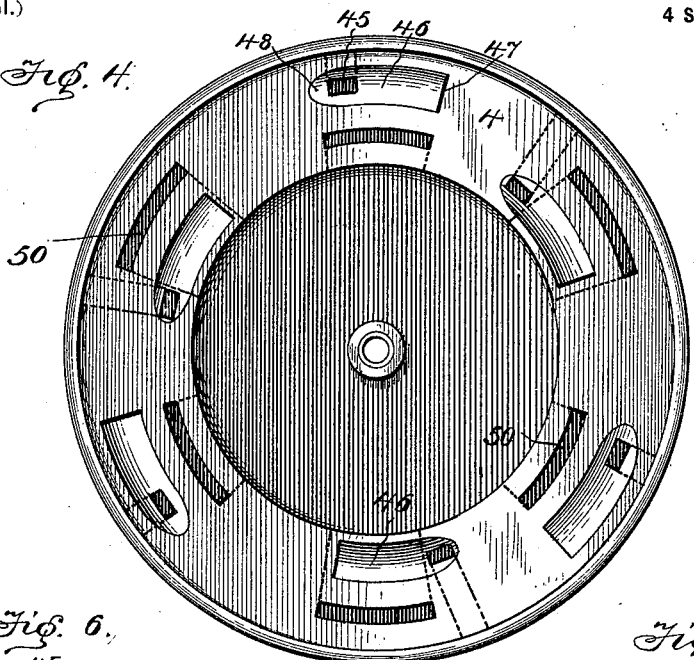
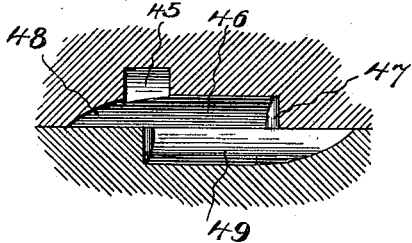
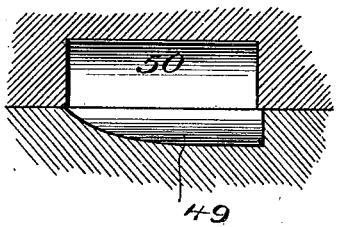
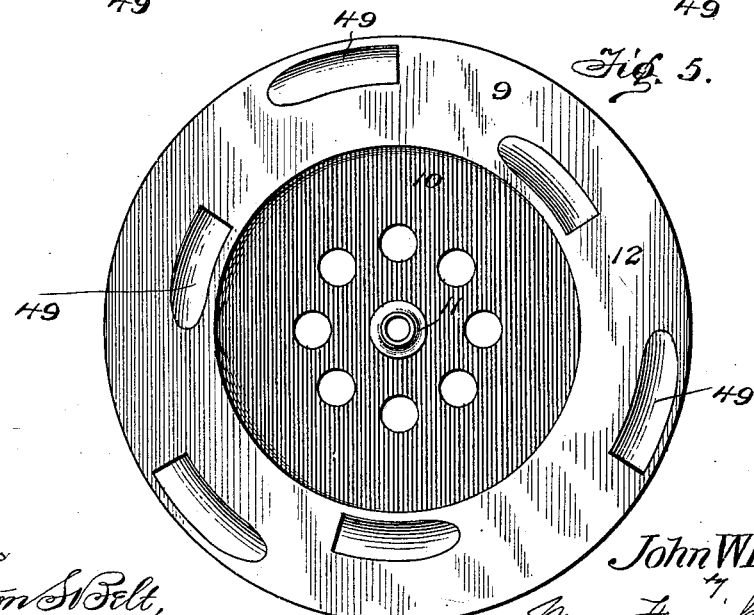
Witnesses
Fenton S. Belt,
Marcus L. Byng.
Inventor
John W. Eisenhuth
by
Mason Fenwick Lawrence
his Attorneys

UNITED STATES PATENT OFFICE.

JOHN W. EISENHUTH, OF NEW YORK, N. Y., ASSIGNOR, BY MESNE ASSIGNMENTS, TO MAMIE G. READ, OF SAME PLACE.

MOTOR FOR VEHICLES.

SPECIFICATION forming part of Letters Patent No. 664,018, dated December 18, 1900.

Application filed January 25, 1900. Serial No. 2,785. (No model.)

*To all whom it may concern:*

Be it known that I, JOHN W. EISENHUTH, a citizen of the United States, residing at New York, in the county of New York and State of New York, have invented certain new and useful Improvements in Motors for Vehicles; and I do hereby declare the following to be a full, clear, and exact description of the invention, such as will enable others skilled in the art to which it appertains to make and use the same.

My invention relates to motors for the propulsion of vehicles or the actuation of machinery of any kind, and more especially to gas or other explosive motors especially designed for propelling automobiles.

The object of the invention is to improve the construction of such engines or motors, whereby the greater part of the power generated is effectually utilized in driving the motor.

With this object in view my invention consists in an improved motor of this class in which the explosive force actuates pistons to rotate a shaft, the return strokes of the piston compressing the exploded gases into a suitable reservoir where the expansive power of such compressed gases is exerted upon suitable resistances to accelerate the motion or increase the power of the engine and the reciprocation of the pistons utilized to exhaust the gases from the interior of the engine, thus attempting to create a vacuum, which further aids the operation.

My invention further consists in the improved construction, combination, and arrangement of the various parts of an engine of this general class, which will be fully described hereinafter and afterward specifically pointed out in the appended claims.

Figure 1:
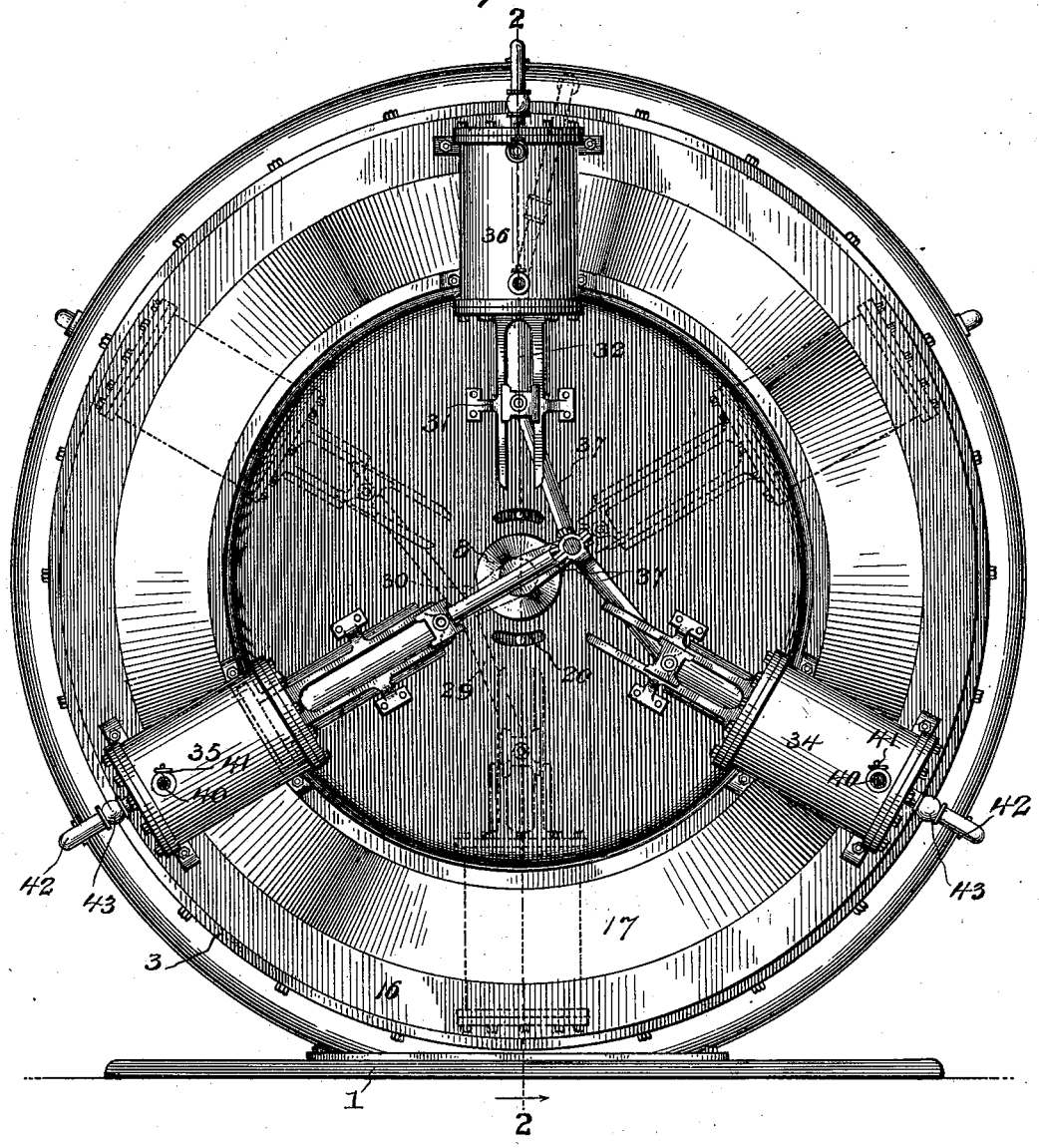
Figure 2:
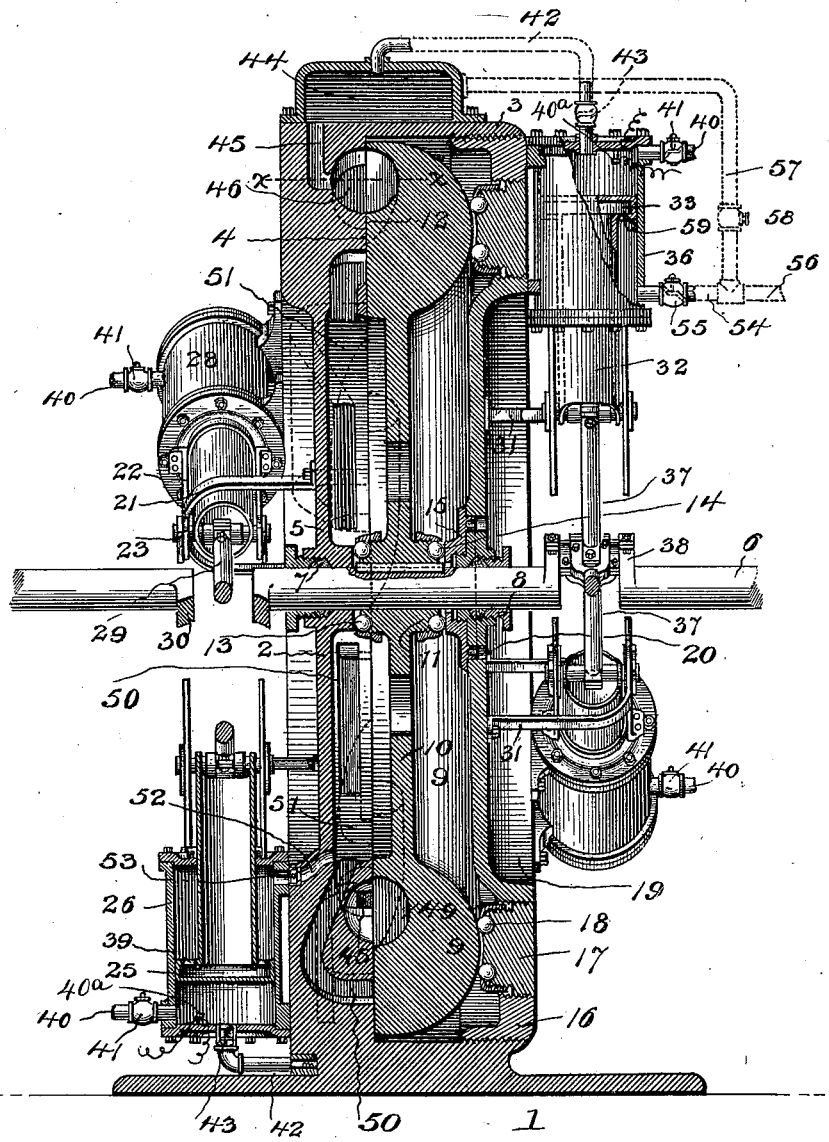
Figure 3:
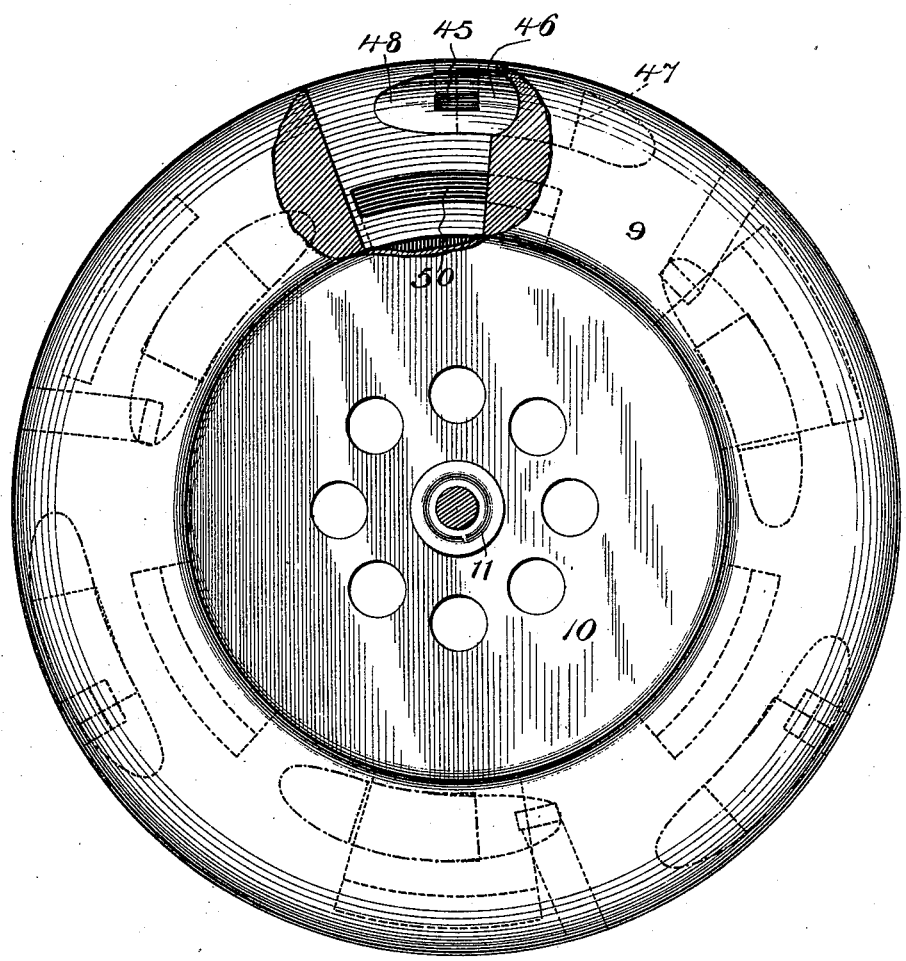

In the accompanying drawings, Figure 1 is a view in side elevation of an engine constructed in accordance with my invention. Fig. 2 is a vertical sectional view taken on the plane indicated by the broken line 2 2 of Fig. 1. Fig. 3 is a view in side elevation of the piston fly-wheel, parts being broken away to show part of the frame of the engine behind the wheel, recesses and passages in the frame being shown in dotted lines and those in the piston fly-wheel in dot-and-dash lines.

Fig. 4 is a view in elevation, on a reduced scale, of the body or frame of the engine, parts being broken away. Fig. 5 is a similar view of the inner face of the piston fly-wheel. Fig. 6 is a fragmentary sectional view through the frame and piston fly-wheel on the plane indicated by the dotted line *x x* of Fig. 2, through one of the recesses in the wheel and frame, and an inlet-passage. Fig. 7 is a similar sectional view through one of the recesses in the wheel and an exhaust-passage.

Like numerals mark the same parts in all the figures of the drawings.

Referring to the drawings by numerals, 1 indicates a suitable base upon which is mounted the main body or frame 2 of the engine, said frame being vertical in position and circular in outline and provided with a laterally-extending rim 3, an annular wall or face 4, and a thin central diaphragm-like portion 5.

The main shaft is indicated at 6, journaled centrally in the frame 2 and passing through suitable stuffing-boxes 7 8 to prevent leakage from a central vaccum-chamber formed in a manner and by means hereinafter described.

Splined or otherwise secured upon the shaft 6 is a fly-wheel 9, which also serves the purpose of a rotary piston-head, as hereinafter explained. This fly-wheel consists of a heavy outer rim, a thin diaphragm-like body portion 10, and a hub 11, the outer rim being provided on one side with a flat face 12, which during the operation of the engine rotates in contact with the face 4 of the main body 2 of the engine, being held from too great friction thereon by means of ball-bearings 13 between the main body of the engine and the inner end of the hub 11. Similar ball-bearings 14 on the outer end of the hub 11 serve to prevent friction between that end of the hub and the collar 15. In assembling the parts of the engine hereinbefore described a ring 16 is threaded into the rim 3. A second ring 17 is threaded into the ring 16, and suitable ball-bearings 18 interpose between the inner face of said ring 17 and the piston fly-wheel 9. A disk 19 is now threaded into the ring 17, which disk forms one wall of the vacuum-chamber, hereinbefore referred to, the shaft 6 being journaled in this disk and the stuffing-box 8, before mentioned, being located at this journal. The collar 15 is used to take up wear on the ball-bearings at the hub of the wheel 9, being threaded upon the hub of the disk 19 and adjustable by means of a spanner operated through curved slots 20 in said disk.

21 indicates brackets secured to and projecting laterally from the diaphragm 5 of the main body of the engine, which brackets serve to support the guides 22 for shoes 23 of piston-rods 24 of pistons 25, which work in cylinders 26, 27, and 28, secured in radial positions to the frame of the engine, the piston-rods being connected by pitmen 29 to a single crank 30 on the shaft 6. Similar brackets 31, secured to the disk 19, support guides for the shoes of piston-rods 32 of piston-heads 33, working in cylinders 34, 35, and 36, secured to the opposite side of the engine in radial positions alternating with the cylinders 26, 27, and 28, heretofore described, the piston-rods 32 being connected by pitmen 37 to a single crank 38 on the shaft 6.

While I have described six cylinders, arranged three on each side of the engine, I desire it to be understood that the number may be varied and more or less may be used, if desired.

The piston-rods and piston-heads of all the cylinders are preferably made hollow, with their projecting ends left open to the atmosphere, whereby their temperature is kept somewhat reduced in operation. Inwardly-opening valves 39 are provided to afford communication between the inner ends of the cylinders and the interior of the pistons and piston-heads, as clearly shown in the sectional illustration of the cylinder 26 in Fig. 2.

40 indicates inlet-pipes provided with check-valves 41, through which pipes a mixture of gas and air is conducted into the cylinders from any suitable supply under pressure. 42 indicates pipes provided with check-valves 43, said pipes affording communication between the outer ends of the cylinders and a circular storage-chamber 44, secured on the circumference of the main body of the engine. 45 indicates passages leading from said storage-chamber into the recesses 46, formed in the face 4 of the main body of the engine, said recesses having radial walls 47 at one end and inclined walls 48 at the other.

49 indicates recesses formed in the flat face 12 of the piston fly-wheel 9, which recesses are arranged at the same distances from the shaft as the recesses 46, whereby during the rotation of the wheel 9 its recesses and those in the main body of the engine will be caused to register with each other periodically. Alternating with the recesses 46 in the same circle are elongated discharge-ports 50, which lead from the face 4 into the vacuum-chamber 51, hereinbefore mentioned.

It will be observed by inspection of Figs. 2 and 3 that I have arranged six recesses 46 and six recesses 49 in two concentric circular series, discharge-ports 50 alternating with the recesses in each circle. It will be understood, however, that the number of recesses and ports may be varied, that they may be all arranged in one circle, or that they may be arranged in more than two circles, if desired. In said view, Fig. 3, those recesses and ports in the face 4 of the main body of the engine which are not shown in full lines are indicated in dotted lines, while those recesses in the face 12 of the wheel are indicated by dot-and-dash lines 52 indicates passages provided with check-valves 53, leading from the vacuum-chamber 51 into the inner ends of the cylinders. In some instances I dispense with this communication by means of passages 52 and 53 between the vacuum-chamber and the cylinders and provide, as specifically shown in connection with cylinder 36 in Fig. 2, a pipe 54, provided with a check-valve 55 and leading, as at 56, to tanks or reservoirs (not shown) or by a branch pipe 57 into the annular storage-chamber, said pipe 57 being provided with an ordinary valve 58. In this construction valves 59, opening outwardly from the hollow piston-head into the cylinder, are substituted for valves 39 in the other cylinders.

In the operation of my invention the air and gas mixture is introduced into the outer end of the cylinder through the pipe 40 and exploded by any suitable igniter, as at 40ª, the piston of said cylinder being forced inwardly through the medium of its piston-rod, pitmen, and crank rotating the shaft 6, carrying the rotary piston fly-wheel with it. The several pistons being actuated successively, a continuous rotative force will be exerted upon the shaft, the crank during such rotation carrying the pistons upward on their return stroke. During this return stroke of the piston the contents of the cylinder are forced out through pipes 42 and compressed into the annular chamber 44. The piston fly-wheel 9 being carried around with the shaft, its recesses 49 are successively brought into register with the recesses 46 in the face 4 of the main body of the engine. At this point the compressed contents of the annular chamber 44 pass through the inlet-passages 45 into these registering recesses, and the radial walls 47 of the recesses, acting as abutments, will receive the expansive force of the gases admitted, thereby accelerating the motion of the piston fly-wheel. The further rotation of the piston fly-wheel brings its recesses 49 into register with the discharge-ports 50, through which the contents of these recesses are exhausted into the vacuum-chamber 51. As before stated, this vacuum-chamber communicates by means of passages 52 with the inner ends of the cylinders, and during the return stroke of the piston the contents of the vacuum-chamber are pumped into the inner ends of the cylinders through these passages. During the next forward stroke of the pistons the contents of the inner ends of the cylinders thus pumped from the vacuum-chamber 51 are discharged through valves 39 and the hollow piston and rod into the outer atmosphere.

In the construction illustrated with reference to cylinder 36 in Fig. 2 the outward or return stroke of the piston admits air through the hollow piston-rod and valves 59 into the inner end of the cylinder, from which such air during the inward or forward stroke of the piston is forced through pipe 54 and compressed in tanks (not shown) or through pipe 54 and its branch 57 and compressed into the annular compression-chamber 44. By means of this construction a continuous rotative force is exerted upon the shaft, as before described. When the gas in the cylinder is ignited, which takes place just after the piston has started on its inward stroke, the direct force of the explosion is exerted to drive the piston inward and any surplus explosive force is transmitted through check-valves 43 and pipes 42 into the storage-chamber and the exploded gas in the cylinder is forced through the said valve and pipe into the storage-chamber by the return stroke of the piston. The surplus expansive force and the power exerted by the pistons on their return strokes compress the gases in the circular storage-chamber 44. From this chamber the expansive force is applied almost at the circumference of the piston fly-wheel to increase the speed and power of its rotation. The recesses in the wheel are continuously exhausted into the vacuum-chamber, the pumping force of the return stroke of the pistons maintaining a partial vacuum in said chamber and creating a continuous inward suction to facilitate the instant exhausting of the recesses when in register with the exhaust-passages or discharge-ports in the main body of the engine. It will be observed that all the parts are so constructed and rendered adjustable that all wear may be taken up and friction reduced to a minimum.

While I have specifically described the construction of the various parts of my improved invention, it will be obvious to those skilled in the art that many material changes might be made in the form thereof without departing from the spirit of my invention.

Having thus fully described my invention, what I claim as new, and desire to secure by Letters Patent of the United States, is—

1. In an engine the combination with a shaft, a crank thereon, a piston connected to said crank and a cylinder in which said piston reciprocates, of a circular storage-chamber, a pipe communicating between the outer end of the cylinder and said storage-chamber, a check-valve therein, a pipe for delivering the explosive mixture into said end of the cylinder, and a rotary or wheel piston having recesses which are periodically brought into communication with the storage-chamber, substantially as described.

2. In an engine the combination with the main frame or body thereof provided with a storage-chamber surrounding the same, recesses in the face of the frame, a passage communicating between the storage-chamber and said recesses and means for filling the storage-chamber, of a shaft journaled in the main frame, and a piston fly-wheel splined on said shaft and having a face in contact with the face of the body, in which face of the wheel are formed recesses similar to those in the main body and adapted to be brought periodically into register therewith during the rotation of the wheel, said recesses being each formed with one end wall inclined and the other in a radial plane, an exhaust-passage being formed through the main body of the engine in position to register periodically with the recesses in the wheel, substantially as described.

3. In an engine provided with a central vacuum-chamber, a surrounding storage-chamber, and means for filling the storage-chamber, the combination with the main frame having recesses in one face thereof, inlet-passages from the storage-chamber to said recesses, and an exhaust-passage extending from the face of the frame into the vacuum-chamber, of a wheel provided with recesses similar to those in the face of the frame, and arranged to be brought alternately into register with a body-recess and an exhaust-passage by the rotation of the wheel, and means for pumping out the vacuum-chamber, substantially as described.

4. In an engine provided with a central vacuum-chamber, a surrounding storage-chamber and means for filling the storage-chamber, the combination with the main frame having recesses in one face thereof, inlet-passages from the storage-chamber to said recesses, and an exhaust-passage extending from the face of the frame into the vacuum-chamber, of a wheel provided with recesses similar to those in the face of the frame, and arranged to be brought alternately into register with a body-recess and an exhaust-passage by the rotation of the wheel, radially-arranged cylinders secured to the frame having communication between their inner ends and the vacuum-chamber, and pistons in the cylinders arranged to pump out the vacuum-chamber during their return stroke, substantially as described.

5. In an engine the combination with the main frame thereof circular in outline and provided with a central bearing, a flat face on the inside near the periphery and a laterally-extending rim, of a shaft journaled in the central bearing, a piston fly-wheel splined on the shaft and provided with a flat face adapted to rotate in contact with the flat face of the frame, a ring threaded into the rim of the body, an inner ring threaded into the ring aforesaid and a disk threaded into the inner ring and provided with a central bearing for the shaft, substantially as described.

6. In an engine the combination with the main frame thereof circular in outline and provided with a central bearing, a flat face on the inside near the periphery and a laterally-extending rim, of a shaft journaled in the central bearing, a piston fly-wheel splined on the shaft and provided with a flat face and adapted to rotate in contact with the flat face of the frame, a ring threaded into the rim of the body, an inner ring threaded into the ring aforesaid, a disk threaded in the said inner ring and provided with an inner bearing for the shaft and curved slots, a collar threaded on the inner side of the disk and exposed through said slots for adjustment, ball-bearings between the inner ring and the piston fly-wheel, between the hub of the fly-wheel and the central bearing of the frame, and between the hub of the fly-wheel and the inner ring, the hub-bearings being adjusted by turning the collar by means of a tool inserted through the curved slots, substantially as described.

7. The combination in an engine with the frame thereof of a series of radially-arranged cylinders, a shaft, pistons in the cylinders connected up with said shaft, a rotary piston head or wheel on said shaft, expansive means for actuating the radial pistons on their inward or forward stroke and means for utilizing any surplus expansive force and the outward or return stroke of the pistons to actuate the piston head or wheel, substantially as described.

8. The combination in an engine with the main body thereof provided with a vacuum-chamber, a shaft journaled in said main body, a rotary piston head or wheel splined on the shaft and provided with recesses to receive compressed fluids for actuating the piston-wheel, said recesses being arranged to communicate periodically with the vacuum-chamber, cylinders mounted upon the frame of the engine and communicating with the vacuum-chamber, pistons in said cylinders connected to a crank on the shaft whereby the rotation of the shaft causes the return stroke of said pistons, thereby pumping out the vacuum-chamber, substantially as described.

9. In an engine provided with a vacuum-chamber the combination with the frame of the engine of a cylinder mounted thereon having communication between its inner end and the vacuum-chamber, a hollow piston-head in the cylinder, a hollow piston-rod connected with said head projecting through the end of the cylinder and open to the atmosphere, and valves opening from the inner end of the cylinder into the hollow piston rod and head whereby, by the reciprocation of the piston the contents of the vacuum-chamber are pumped out and discharged into the atmosphere, substantially as described.

In testimony whereof I hereunto affix my signature in presence of two witnesses.

JOHN W. EISENHUTH.

Witnesses:
VAN BUREN LAMB,
GEORGE W. BLAIR.